INVENTORS
WILLIAM D. MULLINS JR.
ROBERT E. SMITH
BY
*William R. Lane*
ATTORNEY

Dec. 13, 1955

W. D. MULLINS, JR., ET AL 2,726,545

MACH NUMBER DEVIATION INDICATOR

Filed May 16, 1950

INVENTORS
WILLIAM D. MULLINS JR.
ROBERT E. SMITH
BY

*William R Lane*
ATTORNEY

Dec. 13, 1955　　W. D. MULLINS, JR., ET AL　　2,726,545
MACH NUMBER DEVIATION INDICATOR

Filed May 16, 1950　　　　　　　　　　　　4 Sheets-Sheet 3

INVENTORS
WILLIAM D. MULLINS JR.
BY　ROBERT E. SMITH

*William R. Lane*

ATTORNEY

Dec. 13, 1955   W. D. MULLINS, JR., ET AL   2,726,545
MACH NUMBER DEVIATION INDICATOR
Filed May 16, 1950   4 Sheets-Sheet 4

INVENTORS
WILLIAM D. MULLINS JR.
ROBERT E. SMITH
BY
*William R. Lane*
ATTORNEY

United States Patent Office 2,726,545
Patented Dec. 13, 1955

2,726,545
MACH NUMBER DEVIATION INDICATOR
William D. Mullins, Jr. and Robert E. Smith, Downey, Calif., assignors to North American Aviation, Inc.
Application May 16, 1950, Serial No. 162,242
6 Claims. (Cl. 73—182)

This invention pertains to the measurement of Mach number, and specifically to the measurement of deviation in Mach number at variable altitude.

In the design of guided missiles and various other high speed aircraft it has been found that maximum fuel economy may be obtained from a ram jet propulsion system when it operates under conditions resulting from a uniform and relatively high air speed. This speed is dependent upon altitude as it affects air density, and upon the required fuel-to-air ratio of the ram jets. It is therefore desirable, especially in long flights, to find the most economical speed and to maintain that speed throughout the flight. Mach number is defined as the ratio between the air speed of an object and the speed of propagation of sound in air under the same conditions. Mach number, thus, is a measure of speed which takes into account the density of the air, because the speed of sound varies with air density according to the formula:

$$V = \sqrt{1.40 \frac{P}{D}}$$

where P is the pressure, and D is the density of the air.

It is generally required that an aircraft or missile be adapted to travel at variable altitude; and since it is desired to cause the aircraft to fly at maximum efficiency at all altitudes, it follows that if it were possible to cause the aircraft to fly at a constant unvarying Mach number at variable altitude, the requirement of maximum efficiency could be met at all times.

Instruments adapted to measure Mach number have been devised in the past, especially for the measurement of Mach numbers at or below 1.0. These devices would be unsatisfactory for causing the aircraft to fly at a given Mach number because of their characteristic lack of sensitivity, since they measure total Mach number rather than the deviation from a desired Mach number. All of these instruments rely for the measurement of Mach number upon the ratio of stagnation air pressure to static air pressure in some kind of a pressure sensitive device. "Stagnation air pressure" is defined as synonymous with "impact pressure." At sea level, where static air pressure is 14.7 pounds per square inch—and if one were measuring speeds of the order of Mach number 2.5—the ratio of stagnation air pressure to static air pressure would be about 8.45. The device would need to be sensitive to a stagnation pressure difference of 1.05 pounds per square inch in order to indicate $\frac{1}{100}$ of a Mach number. This is probably within the capability of some conventional Mach number meters. However, as the altitude of the aircraft is increased the static pressure decreases rapidly, so that at an altitude in the neighborhood of 80,000 feet the static pressure is approximately .403 pound per square inch. At this altitude—assuming again a Mach number of 2.5—the stagnation air pressure would be in the neighborhood of 3.4 pounds per square inch; and in order to measure Mach number to the nearest $\frac{1}{100}$ of a Mach number the pressure sensitive device would need to be sensitive to .026 of a pound per square inch stagnation pressure difference. It can be seen without further explanation that a conventional Mach number meter would be quite unsatisfactory for the close measurement of Mach number at high altitude, and would be even more unsatisfactory for the measurement of Mach number deviation at high altitude.

It is an object of this invention to provide a Mach meter adapted to measure Mach number over a limited range at high altitude.

It is a further object of this invention to provide a Mach meter adapted to measure Mach number deviation.

It is a further object of this invention to provide a Mach meter adapted to measure Mach number deviation at variable altitude.

It is a further object of this invention to provide a Mach meter having high resolution and extreme accuracy.

It is another object of this invention to provide a Mach meter having an output in electrical form.

It is a further object of this invention to provide a Mach meter which is simple of assembly and trouble-free in operation.

It is another object of this invention to provide a Mach number deviation indicator whose output is in electrical form.

It is another object of this invention to provide a Mach number deviation indicator which is insensitive to accelerations.

It is yet a further object of this invention to provide a Mach number deviation indicator whose sensitivity is substantially independent of altitude.

Other objects of invention will become apparent from the following description taken in conjunction with the accompanying drawings, in which.

Figure 1:
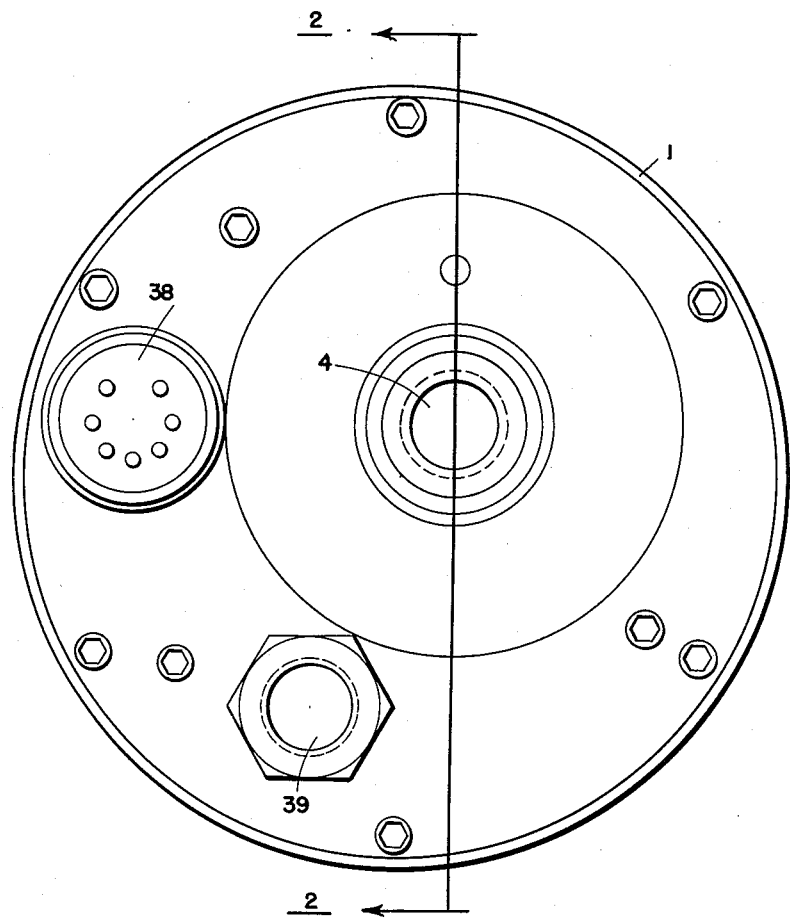
Fig. 1 is an end view of the invention.
Figure 3:
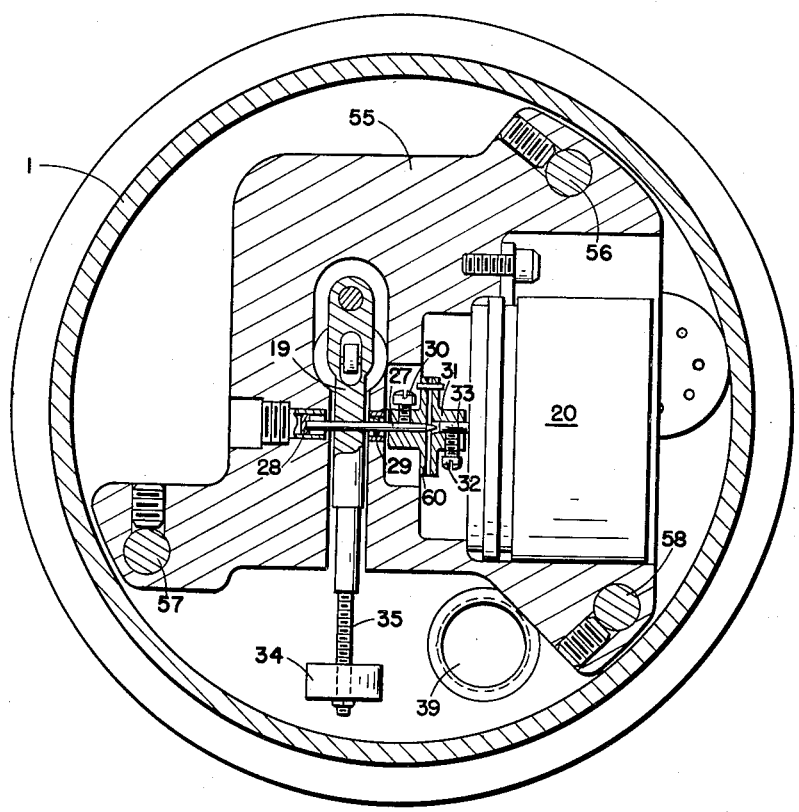
Fig. 3 is a sectional view of the device shown in Fig. 2 taken at 3—3 in Fig. 2.
Figure 4:
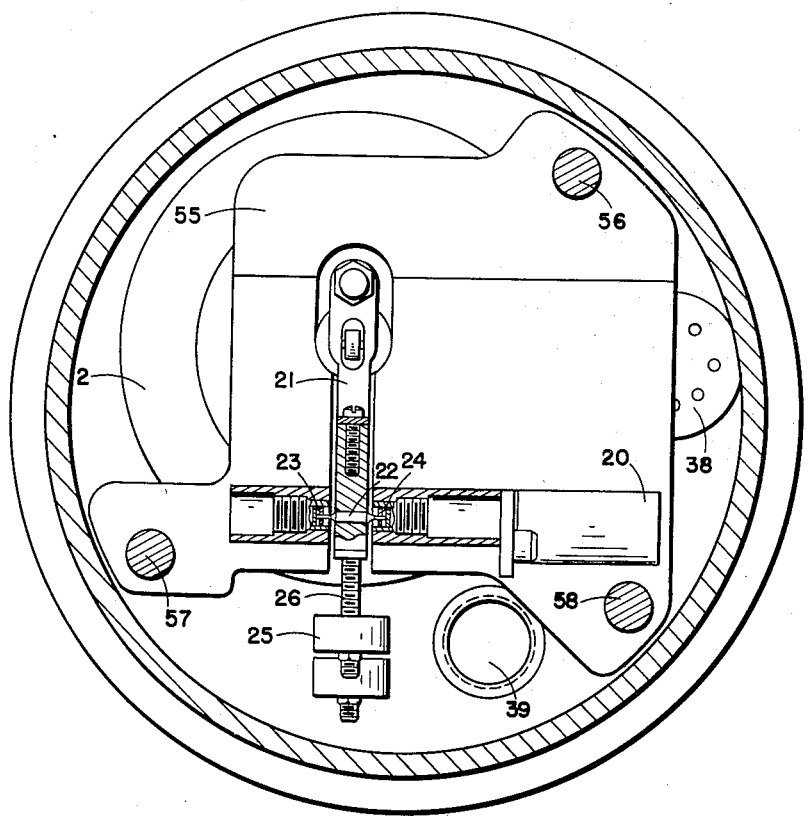
Fig. 4 is a sectional view of the device shown in Fig. 2 taken at 4—4 in Fig. 2.

Referring to the drawings, a rigid, hermetically sealable case 1 encloses an evacuated bellows 2 which, in turn, encloses stagnation air bellows 3 which communicates with a stagnation air duct (not shown) by means of port 4. Stagnation air bellows 3 operates on the same bellows head as does bellows 2, and head 5 is connected to an overload mechanism 6 comprising a spring 7, a case 8, a spring retainer 9, a guide bolt 10 and a spring 11 for a purpose to be hereafter related. Case 1 also encloses a bellows 12 which, like bellows 2, is evacuated. Bellows 12 is attached to bellows head 13 and is held in extended position by compression spring 14. An overload device 15, similar to that shown in connection with bellows 2, connects head 13 to flexure member 16 which, in turn, is rigidly connected to elbow member 17 pivotally connected by a pin 18 to a bell crank 19 adapted to drive an angular pickoff 20. Flexure member 16 also actuates lever 21 which is pivotable by means of pin 22 on jewel bearings 23 and 24 shown in detail in Fig. 4. Counterweight 25 hangs on lever 21 and is adjustable vertically (in Figs. 1 and 4) on threaded bolt 26. Bell crank 19 is supported on pin 27 in jewel bearings 28 and 29, and pin 27 is clamped to connector 60 by means of setscrew 30. Connector 60, in turn, is rigidly fastened to connector 31 and connector 31 is clamped by means of setscrew 32 to a shaft 33 which drives angular pickoff 20. Bell crank 19 also supports counterweight 34 by means of adjustable threaded bolt 35 and counterweight 36 by means of adjustable threaded bolt 37—the purpose of these counterweights being to compensate and balance bell crank 19 against accelerations in any direction parallel to the plane of Fig. 2. In the end of case 1, electrical plug 38 for carrying electricity to and from pickoff 20 is provided. A port 39 is provided for the purpose of communicating static air pressure into case 1. A conduit 40 leads from the inside of case 1 to annular space 41 and to end chamber 42 where ducts 43 and 44 are allowed to conduct air to the inside of seal bellows 45. Seal bellows 45 is provided to effectuate a seal of bellows 12 which must be evacuated and to allow axial movement of nut 47 for adjustment of the compressive force of spring 14. Within bellows 12 spring 14 is held in place by collar member 46 threaded for engagement with end plug 47. Bellows stop 48, having axial duct 49 and lateral ducts 50, 51, 52 and 53, is provided between head 13 and collar member 46 for lateral support of spring 14 and to prevent collapse of bellows 12. Filler 54, annular in shape, is provided in the space surrounding bellows 12 to reduce the volume of static air enclosed in case 1. Support frame 55, for supporting jewel bearings 23 and 24 and angular pickoff 20 and its associated parts, is supported for longitudinal adjustment on support rods 56, 57, and 58, shown in Figs. 2, 3 and 4.

In operation, static air pressure is furnished via port 39 to the inside of case 1. Static air pressure therefore surrounds belows 2 and 12, and since these bellows are evacuated they tend to shrink or decrease in length. Air at stagnation pressure enters stagnation air bellows 3 via port 4 and exerts a force to the right on bellows head 5. Bellows 2, on the other hand, since it is evacuated, exerts a force on bellows head 5 to the left.

If it is desired that the instrument detect Mach number deviations from, for example, a Mach number of 2.5, the ratio of the stagnation air pressure to static air pressure will be approximately 8.45. The end area of bellows 2 must therefore be 8.45 times the end area of bellows 3 in order that no net force will result at the required Mach number. Any deviation from the required Mach number is reflected by the combination of bellows 2 with bellows 3 in a movement of bellows head 5. This movement is transmitted to bell crank 19 by guide bolt 10 and pivot 59. Bell crank 19 being attached to angular pickoff 20 causes rotation thereof, and pickoff 20 generates an electrical signal which is proportional to the deviation of the ratio of stagnation air pressure to static air pressure from the null-point ratio.

If the device thus far described were kept at sea level it would be effective in measuring Mach number deviation only over a very limited range. In addition, a more basic defect of the device as thus far described is that it is altitude sensitive in that its relative sensitivity would decrease as the altitude were increased, because while a pressure ratio of 8.45 at sea level results in a relatively large pressure in pounds per square inch to be detected, a ratio of 8.45 at very high altitude yields a much smaller pressure to be sensed. The device would therefore be relatively insensitive and imprecise at high altitude.

The first difficulty, namely, that due to increased spring forces resulting from the springiness of bellows 2 and 3 with increased deflection, is eliminated in this invention by the provision of spring 14 and the mechanical linkage by which its force is applied to bell crank 19. Bellows 2 and 3, as well as all other bellows in the invention, are so designed that when the device is totally unevacuated they exert no spring forces in their neutral position. However, all of these bellows act as springs when deflected, and the restoring force is proportional to the deflection.

The way in which spring 14 neutralizes the spring effect of the various bellows for small rotational deflections of bell crank 19 can be best understood if a small deflection of bell crank 19 is assumed. When bell crank 19 is deflected, pin 18 moves downward. The line of action of the force in compression spring 14 then creates a torque about the pivot point of bell crank 19 which tends to further deflect bell crank 19 in the direction originally assumed. However, the spring forces of the various bellows act in opposition to this torque and produce a countertorque tending to restore bell crank 19 to its undeflected position. Now if spring 14 is so adjusted that for small deflections the torque produced by it on bell crank 19 exactly balances the restoring torque produced on bell crank 19 by the various bellows, it can be said that the spring constant of the bellows system has been effectively canceled out. Bell crank 19 may therefore be moved through small angular deflections and will stay in any position to which it is moved within small limits of deflection.

Figure 2:
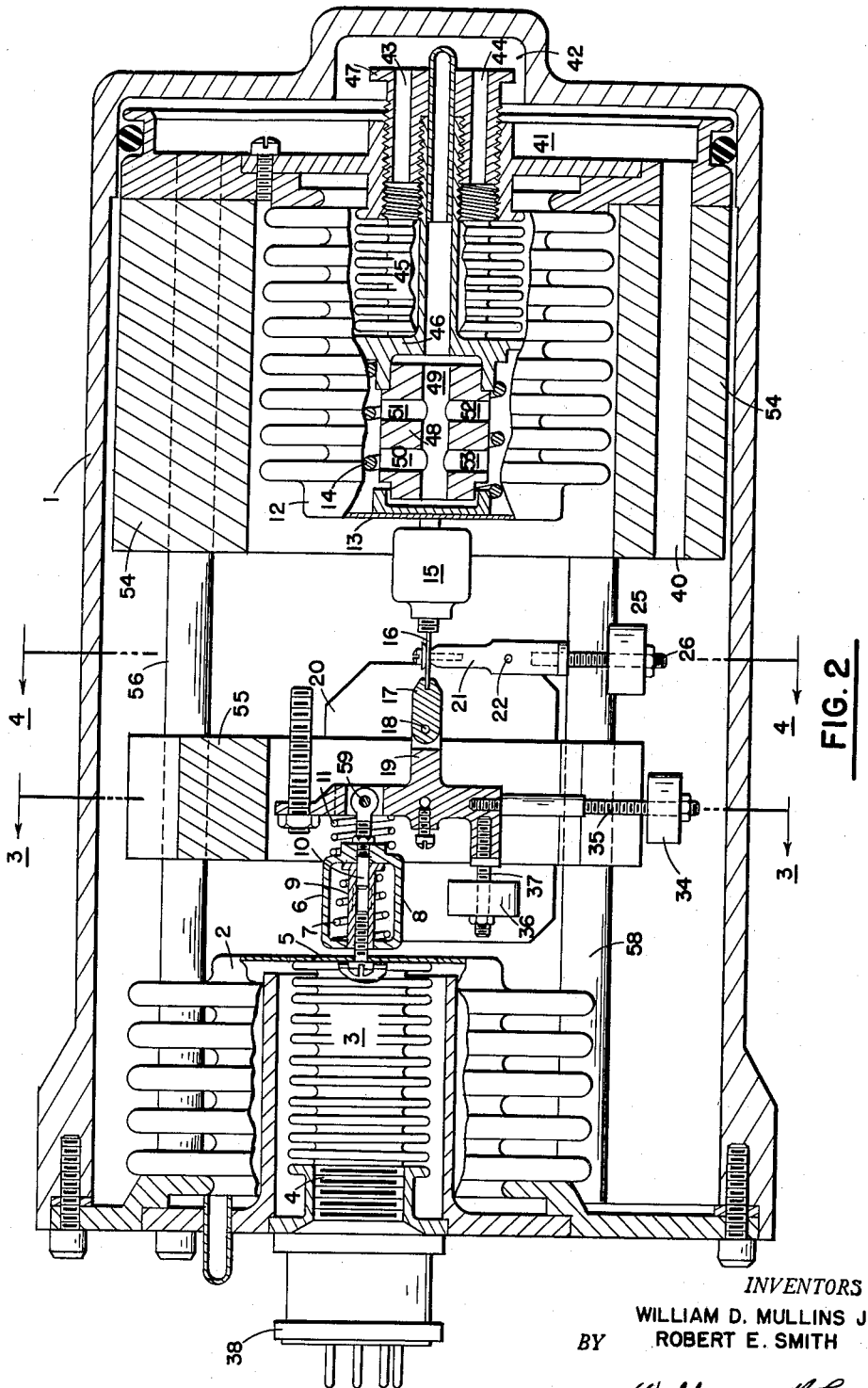
Fig. 2 is a sectional longitudinal view of the device taken at 2—2 in Fig. 1.

Compression spring 14 is so chosen that the resultant spring constant of the entire moving system is zero in unevacuated condition. The adjustment of the force in spring 14 is accomplished by rotation of collar 46 in end plug 47 (as indicated in Fig. 2) by their interthreaded portions. Counterweights 25, 36 and 34 are attached to bell crank 19 and to lever 21 so that the effects of accelerations on the movable parts of the mechanism may be completely canceled out.

To meet the second defect of the device as described above, namely, that it is altitude sensitive, there would be required, ideally, some means for producing on bell crank 19 a variable restoring torque proportional to static air pressure and hence to altitude.

In other words, what is required, ideally, is a restoring spring having a spring constant which varies directly with static air pressure so that as altitude is increased the restoring torque against which the torque due to bellows head 5 must work becomes progressively lighter. Such a spring is, in effect, provided by bellows 12. With static pressure outside bellows 12 it tends to pull the linkage to which it is attached to the right, and as the static pressure decreases this force decreases proportionally. Therefore, bellows 12 acts as a restoring spring having a spring constant proportional to static pressure. Bell crank 19 therefore becomes easier and easier to turn as the altitude is increased, and the extent to which bell crank 19 becomes easier to turn is adjusted to match the extent to which the forces upon bellows head 5 become lighter due to increased altitude. As altitude increases, in other words, bellows 12 exerts an increasing upsetting force on bell crank 19.

Casing 8, spring 7 and guide pin 10 attached to casing 8 and slideable in spring retainer 9 are provided to eliminate overloading of the bearing of bell crank 19 due to the force exerted by bellows 12 when the device is at or near sea level altitudes. Bellows 2 and 3 are thus connected to spring retainer 9 which slides with respect to casing 8 and pin 10. If excessive forces are transmitted by bellows 12, overload device 15 yields, thereby absorbing the motion which would otherwise occur and preventing application of excessive load on the bearing for bell crank 19. In a similar way when bellows 2 is evacuated, but when stagnation air bellows 3 is left at static air pressure, excessive forces would be transmitted to the bearing of bell crank 19, resulting in bearing overload if it were not for the fact that spring 7 is adapted to yield before the critical bearing load is attained.

Although the present utility of this invention resides largely in its advantageous use in connection with the measurement of Mach number, it is obvious that it is adapted to measure accurately the deviation in the ratio between any two pressures $P_1$ and $P_2$ and that the sensitivity of the device for such deviation measurements does not vary with the magnitude of $P_2$, the smaller pressure.

Although the invention has been described and illustrated in detail, it is to be clearly understood that the same is by way of illustration and example only and is not to be taken by way of limitation, the spirit and scope of this invention being limited only by the terms of the appended claims.

We claim:
1. Means for detecting deviations in the ratio between two pressures $P_1$ and $P_2$ over a wide range of value of $P_2$ with a sensitivity substantially independent of the value of $P_2$ comprising an evacuated bellows, means for applying $P_2$ to the exterior of said bellows, a second bellows, bearing a ratio of cross-sectional area to the cross-sectional area of said first bellows which is the inverse of said ratio of $P_1$ to $P_2$, means for applying $P_1$ within said second bellows, means enclosing said second bellows for apply- ing a vacuum to the exterior thereof, an angular pickoff device, mechanical means for moving said pickoff in proportion to changes in the ratio of $P_1$ to $P_2$, means for applying a counterbalancing torque to said pickoff proportional to the angular displacement thereof and equal and opposite to the restoring torque exerted thereon by said bellows for small displacements, a third bellows, means for applying $P_2$ to the exterior of said third bellows, and means for linking said third bellows to said pickoff so as to provide a restoring torque thereto proportional to $P_2$ whereby the deviation in the ratio of $P_1$ to $P_2$ from the ratio of the cross-sectional areas of said first and second bellows may be detected over a wide range of values of $P_2$ without loss of sensitivity for low values of $P_2$.

2. Means for detecting variations in the ratio of stagnation air pressure to static air pressure with a sensitivity that does not vary with altitude comprising a closed chamber, means for applying static air pressure to said chamber, an evacuated bellows within said chamber, a bellows within said evacuated bellows, having an area ratio with respect to said first-named bellows corresponding inversely to said ratio of stagnation air pressure to static air pressure, means for admitting stagnation air pressure to said last-named bellows, a bellows head responsive to the difference between the forces exerted by said bellows, an angular pickoff device, linkage means for transmitting to said pickoff device the movement of said bellows head in response to said bellows, spring means for applying a counterbalancing torque to said pickoff device proportional to the angular displacement thereof for small displacements, a second evacuated bellows within said chamber and a mechanical linkage between said last-named bellows and said pickoff device for applying thereto a restoring torque proportional to static pressure to thereby detect deviations in the ratio of stagnation air pressure to static air pressure with a sensitivity that does not vary with altitude.

3. In a Mach number indicating device, means for detecting deviations in the ratio of stagnation air pressure to static air pressure comprising a chamber open to static air pressure; an evacuated bellows within said chamber; a second bellows within said evacuated bellows having an area which bears the inverse ratio to the area of said first bellows as said ratio of stagnation air pressure to static air pressure, said second bellows arranged to be operable against a common bellows head with said evacuated bellows; means for applying stagnation air pressure to the interior of said second bellows; indicator means mechanically connected to said bellows; spring means connected to said indicator means for nullifying the spring effect of said bellows; a second evacuated bellows within said chamber mechanically connected to said indicator means in the sense required to elastically restrain said indicator means in proportion to the static pressure within said chamber whereby said Mach number indicating means does not suffer from loss of sensitivity due to changes in altitude.

4. Means for detecting deviations in Mach number comprising a source of stagnation air pressure; a closed chamber; means for applying static air pressure to said chamber; an evacuated bellows within said chamber; a second bellows within said first-named bellows and smaller than said first-named bellows by an amount corresponding to the ratio of static to stagnation air pressure, said first and second bellows being connected to work against the same bellows head; means for supplying said stagnation air pressure to said second-named bellows; a third bellows within said chamber, said third bellows being evacuated; a bell crank pivotable about a point coaxial with the symmetrical axis of said third-named bellows and having one of its arms pivotally connected to said third-named bellows along said symmetrical axis, and the other of its arms pivotally connected to the first and second of said bellows, said arms being connected to said bellows to permit said bellows to cause rotation of said bell crank; and a spring within said third-named bellows normally acting in compression, said spring being of such strength as to cause a torque about the pivot point of said bell crank equal and opposite to the torque produced about said pivot point by said bellows upon slight displacements of said bell crank, whereby the rotation of said bell crank is a measure of the deviation of the ratio of stagnation air pressure to static air pressure from the ratio of the areas of said first-named bellows to said second-named bellows, and the restoring torque acting on said bell crank by virtue of said third-named bellows and said spring is proportional to altitude.

5. Means for measuring the deviation and Mach number of an aircraft from some predetermined value comprising an enclosed chamber to which atmospheric air pressure has access; a first bellows within said chamber; a second bellows within said first bellows, both said bellows operating upon the same bellows head and said first-named bellows bearing an area ratio to said second-named bellows corresponding to the ratio of stagnation air pressure to static air pressure required to attain said predetermined Mach number, and the space between said bellows being evacuated; means for furnishing stagnation air pressure to said second-named bellows; angular pickoff means situated within said chamber; a bell crank pivotable upon said angular pickoff means and mechanically connected to be driven by said first and second-named bellows; a third bellows within said chamber and evacuated; a compression spring within said third bellows and acting upon said third bellows; means for applying a torque to said bell crank in response to forces exerted by said third-named bellows and said spring proportional to the angular deflection thereof and of such magnitude as to nullify the spring forces of said bellows for small angular deflections of said bell crank; and overload means connected between said bellows and said bell crank for relieving excessive loads thereon whereby restoring torque applied to said bell crank for small deflections varies directly with altitude.

6. Mach number deviation measuring means for variable altitude comprising bellows means for detecting deviations in the ratio of stagnation air pressure to static air pressure from a predetermined value; pickoff means responsive to said bellows means for generating an electrical signal proportional to said deviaton; and restoring torque means including a bellows sensitive to static air pressure for furnishing a restraining torque to said pickoff means, said restraining torque being inversely proportional to altitude to thereby measure Mach number deviation with equal sensitivity over a wide variation of altitude, said restoring torque means comprising a bellcrank, one arm of which is connected to said first-named bellows means and a second arm which is connected to said last-named bellows means, and in which said last-named bellows means is so situated with respect to said bellcrank that its axis of symmetry extended coincides with the second arm of said bellcrank and the axis of rotation of said bellcrank.

References Cited in the file of this patent

UNITED STATES PATENTS 2,508,623   Schaefer _____ May 23, 1950

FOREIGN PATENTS 575,008   Great Britain _____ Jan. 30, 1946

OTHER REFERENCES

NACA Wartime Report L–423, NACA Mach Number Indicator for Use in High Speed Tunnels, by Norman F. Smith, originally issued in Advanced Confidential Report 3G.31 in July 1943, declassified May 1947, 2 pp. figs.; 6 pp. description.